(12) United States Patent
Strmcnik et al.

(10) Patent No.: US 11,552,302 B1
(45) Date of Patent: Jan. 10, 2023

(54) MELAMINE MODIFICATION OF FUEL CELL ELECTRODES

(71) Applicant: UCHICAGO ARGONNE, LLC, Chicago, IL (US)

(72) Inventors: Dusan Strmcnik, Lemont, IL (US); Pedro Farinazzo Bergamo Dias Martins, Darien, IL (US); Milena Zorko, Darien, IL (US); Haifeng Lv, Lemont, IL (US); Vojislav Stamenkovic, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 17/481,042

(22) Filed: Sep. 21, 2021

(51) Int. Cl.
*H01M 4/88* (2006.01)
*H01M 4/66* (2006.01)
*H01M 4/92* (2006.01)

(52) U.S. Cl.
CPC ......... *H01M 4/8892* (2013.01); *H01M 4/667* (2013.01); *H01M 4/8882* (2013.01); *H01M 4/92* (2013.01)

(58) Field of Classification Search
CPC .................................................. H01M 4/8892
See application file for complete search history.

(56) References Cited

U.S. PATENT DOCUMENTS

| | | |
|---|---|---|
| 9,379,388 B2 | 6/2016 | Calabrese Barton et al. |
| 2006/0263674 A1 | 11/2006 | Hosoya et al. |
| 2013/0004886 A1 | 1/2013 | Strmcnik et al. |

OTHER PUBLICATIONS

Asahi, et al., "Facile Approach to Enhance Oxygen Reduction Activity by Modification of Platinum Nanoparticles by Melamine-Formaldehyde Polymer," Journal of the Electrochemical Society 166(8), pp. F498-F505 (2019).

Cuesta, et al., "At Least Three Contiguous Atoms are Necessary for CO Formation during Methanol Electrooxidation on Platinum," Journal of the American Chemical Society 128(41), pp. 13332-13333 (2006).

Cuesta, et al., "Cyclic Voltammetry, FTIRS, and DEMS Study of the Electrooxidation of Carbon Monoxide, Formic Acid, and Methanol on Cyanide-Modified Pt(111) Electrodes," Langmuir 25(11), pp. 6500-6507 (2009).

Damjanovic, et al., "Distinction between Intermediates Produced in Main and Side Electrodic Reactions," The Journal of Chemical Physics 45(11), pp. 4057-4059 (1966).

Frank, et al., "pH and potential dependence of the electrical double layer at well-defined electrode surfaces: Cs and Ca2 ions at Pt(111) (2v3 X. 2v.3)R30-CN, Pt(111) (v13 Xv.13)R14-CN, and Pt(111) (2 X 2)-SCN," Langmuir 1(5), pp. 587-592 (1985).

(Continued)

*Primary Examiner* — Brian R Ohara
(74) *Attorney, Agent, or Firm* — Foley & Lardner LLP

(57) ABSTRACT

A method for forming a melamine-modified electrode that includes providing a metal based electrode and patterning a surface of the metal-based electrode by contacting the electrode with a melamine solution to form a patterned metal-based electrode. The patterned metal-based electrode includes metal sites blocked with melamine molecules and metal sites which are not blocked such that the metal-based electrode selectively adsorbs $O_2$ instead of at least one of sulfate, phosphate, or sulphonate. A range of 20% to 40% of the metal sites are blocked with melamine molecules.

20 Claims, 9 Drawing Sheets

(56) References Cited

OTHER PUBLICATIONS

Friedrich, et al., "In-situ spectroscopy of cyanide vibrations on Pt(111) and Pt(110) electrode surfaces: potential dependencies and the influence of surface disorder," Surface Science 335, pp. 315-325 (1995).
Genorio, et al., "Selective catalysts for the hydrogen oxidation and oxygen reduction reactions by patterning of platinum with calix[4]arene molecules," Nature Materials 9, pp. 998-1003 (2010).
Greeley, et al., "Alloys of platinum and early transition metals as oxygen reduction electrocatalysts," Nature Chemistry 1, pp. 552-556 (2009).
Greenwood, et al., "Ordered Growth of Upright Melamine Species on Ni{111}: A Study with Scanning Tunnelling Microscopy and Reflection Absorption Infrared Spectroscopy," The Journal of Physical Chemistry C 116(11), pp. 6685-6690 (2012).
Greenwood, et al., "Self-Assembly of Upright, Partially Dehydrogenated Melamine on Pd(111)," The Journal of Physical Chemistry C 117(44), pp. 22874-22879 (2013).
Huerta, et al., "Potential modulated reflectance spectroscopy of Pt(111) in acidic and alkaline media: cyanide adsorption," Journal of Electroanalytical Chemistry 463(1), pp. 109-115 (1999).
Huerta, et al., "Spectroelectrochemical study on CN-adsorbed at Pt(111) in sulphuric and perchloric media," Electrochimica Acta 44(6-7), pp. 943-948 (1998).
Huerta, et al., "Structural effects of adsorbed CN adlayers on the co-adsorption of OH—at the Pt(111) surface in sulfuric acid medium," Surface Science 431 (1-3), pp. L577-L581 (1999).
Huerta, et al., "Voltammetric and spectroscopic characterization of cyanide adlayers on Pt(h,k,l) in an acidic medium," Surface Science 396(1-3), pp. 400-410 (1998).
Inukai, et al., "Cation Effects on Infrared Reflection Absorption Spectra of Cyanide Adsorbed on Pt(111) Electrode in Electrolyte Solutions," Bulletin of the Chemical Society of Japan 70(8), pp. 1787-1794 (1997).
Jiao, et al., "Design of electrocatalysts for oxygen- and hydrogen-involving energy conversion reactions," Chemical Society Reviews 44(8), pp. 2060-2086 (2015).
Katsounaros, et al., "Oxygen Electrochemistry as a Cornerstone for Sustainable Energy Conversion," Angewanted Chemie 53(1), pp. 102-121 (2013).
Kim & Korzeniewski, "Cyanide adsorbed as a monolayer at the low-index surface planes of platinum metal electrodes: an in situ study by infrared spectroscopy," Journal of Physical Chemistry 97(38), pp. 9784-9787 (1993).
Kim, et al., "Direct Observation of Complexation of Alkali Cations on Cyanide-Modified Pt(111) by Scanning Tunneling Microscopy," Journal of the American Chemical Society 118(2), pp. 393-400 (1996).
Kulkarni, et al., "Understanding Catalytic Activity Trends in the Oxygen Reduction Reaction," Chemical Reviews 118(5), pp. 2302-2312 (2018).
Li, et al., "Electrolyte-Dependent Oxygen Evolution Reactions in Alkaline Media: Electrical Double Layer and Interfacial Interactions," ACS Applied Materials & Interfaces 11(37), pp. 33748-33758 (2019).
Lin, et al., "Self-Assembled Melamine Monolayer on Cu(111)," The Journal of Physical Chemistry C 117(19), pp. 9895-9902 (2013).
Markovic & Ross, "Surface science studies of model fuel cell electrocatalysts," Surface Science Reports 45(4-6), pp. 117-229 (2002).
Markovic, et al., "Oxygen Reduction on Platinum Low-Index Single-Crystal Surfaces in Sulfuric Acid Solution: Rotating Ring-Pt(hkl) Disk Studies," Journal of Physical Chemistry 99(11), pp. 3411-3415 (1995).
Schardt, et al., "Surface coordination chemistry of well-defined platinum electrodes: surface polyprotic acidity of platinum(111)(2 .sqroot. 3 .times. 2 .sqroot. 3)R30.degree.-hydrogen isocyanide," Inorganic Chemistry 24(10), pp. 1419-1421 (1985).
Shao, et al., "Recent Advances in Electrocatalysts for Oxygen Reduction Reaction," Chemical Reviews 116(6), pp. 3594-3657 (2016).
Silly, et al., "Melamine Structures on the Au(111) Surface," The Journal of Physical Chemistry C 112(30), p. 11476-11480 (2008).
Stamenkovic, et al., "Energy and fuels from electrochemical interfaces," Nature Materials 16, pp. 57-69 (2017).
Stickney, et al., "Ordered ionic layers formed on platinum(111) from aqueous solutions," Langmuir 1(1), pp. 66-71 (1985).
Strasser, et al., "Lattice-strain control of the activity in dealloyed core-shell fuel cell catalysts," Nature Chemistry 2, pp. 454-460 (2010).
Strmcnik, et al., "Enhanced electrocatalysis of the oxygen reduction reaction based on patterning of platinum surfaces with cyanide," Nature Chemistry 2, pp. 880-885 (2010).
Strmcnik, et al., "The role of non-covalent interactions in electrocatalytic fuel-cell reactions on platinum," Nature Chemistry 1, pp. 466-472 (2009).
Strmcnik, et al., "Unique activity of platinum adislands in the CO electrooxidation reaction," Journal of the American Chemical Society 130(46), pp. 15332-15339 (2008).
Stuhlmann, "Characterization of an electrode adlayer by in-situ infrared spectroscopy: cyanide on Pt(111)," Surface Science 335, pp. 221-226 (1995).
Subbaraman, et al., "Enhancing Hydrogen Evolution Activity in Water Splitting by Tailoring Li—Ni(OH)2—Pt Interfaces," Science 334(6060), pp. 1256-1260 (2011).
Subbaraman, et al., "Trends in activity for the water electrolyser reactions on 3d M(Ni,Co,Fe,Mn) hydr(oxy)oxide catalysts," Nature Materials 11, pp. 550-557 (2012).
Uemura, et al., "Two-Dimensional Self-Assembled Structures of Melamine and Melem at the Aqueous Solution-Au(111) Interface," Langmuir 27(4), pp. 1336-1340 (2011).
Van Der Vliet, et al., "Mesostructured thin films as electrocatalysts with tunable composition and surface morphology," Nature Materials 11, pp. 1051-1058 (2012).
Wada, et al., "Structural Effects on the Oxygen Reduction Reaction on Pt Single-Crystal Electrodes Modified with Melamine," Electrocatalysis 11, pp. 275-281 (2020).
Walch, et al., "Isotopological Supramolecular Networks from Melamine and Fatty Acids," The Journal of Physical Chemistry C 113(3), pp. 1014-1019 (2009).
Wang, et al., "Advanced Platinum Alloy Electrocatalysts for the Oxygen Reduction Reaction," ACS Catalysis 2(5), pp. 891-898 (2012).
Wang, et al., "Kinetic Analysis of Oxygen Reduction on Pt(111) in Acid Solutions:? Intrinsic Kinetic Parameters and Anion Adsorption Effects," The Journal of Physical Chemistry B 108(13), pp. 4127-4133 (2004).
Zhu, et al., "Hydrogen-bonded Structures of Trimesicand Melamine on Highly Oriented Pyrolytic Graphite," Surface Review and Letters 21(3):1450035, 7 pages (2014).
Zorko, et al., "Improved Rate for the Oxygen Reduction Reaction in a Sulfuric Acid Electrolyte using a Pt(111) Surface Modified with Melamine," ACS Applied Materials & Interfaces 13(2), pp. 3369-3376 (2021).

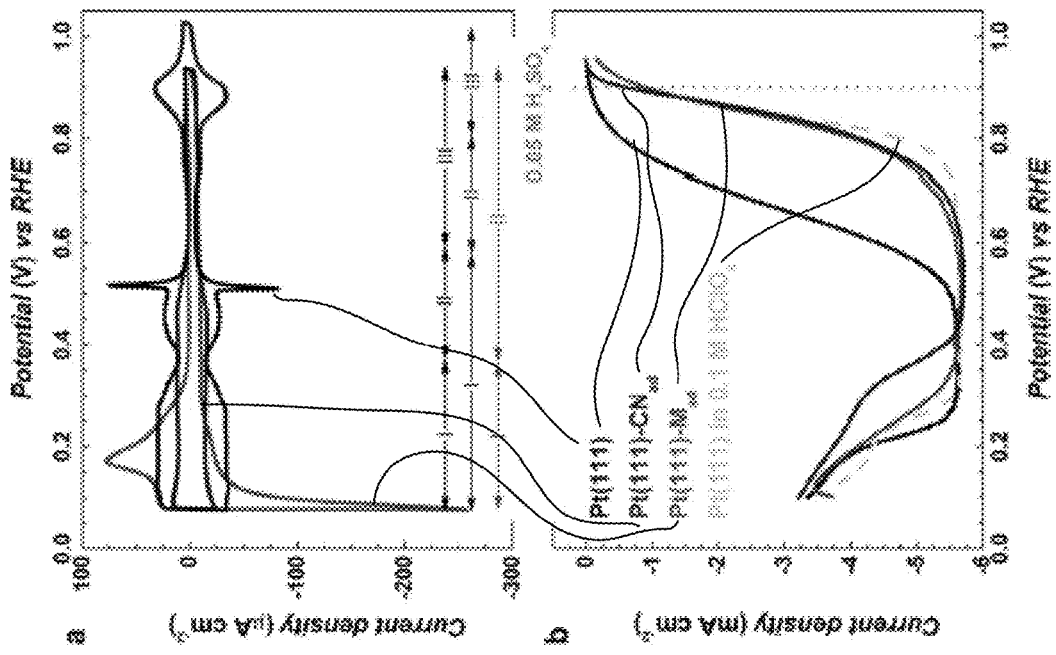

MELAMINE MODIFICATION OF FUEL CELL ELECTRODES

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to melamine modified electrodes and methods of making and using the same.

BACKGROUND

The development of alkaline, polymer electrolyte membranes and phosphoric acid fuel cells has advanced in the past two decades. One of the reasons is the continuous design of new active materials for electrocatalysis of the kinetically sluggish and complicated oxygen reduction reaction (ORR), known as one of the major obstacles for the reliable commercialization of fuel cells, particularly in membrane-electrode assemblies (MEAs). Among these designed materials, platinum-based surfaces continue to be the most active and durable catalysts for the reduction of $O_2$—particularly in acidic media—due to their superior chemical stability over non-noble transition metal surfaces. Traditionally, the parameters considered as guidelines to improve platinum ORR electrocatalysis are based on fine-tuning of the platinum electronic and structural surface properties, which have been shown to potentially increase its catalytic performance. Although the number of approaches used for "surface tuning" is enormous, platinum alloying with non-noble transition metals and/or tailoring platinum nanoparticles with preferential facets have been the most commonly used methods. However, there is still need for alternative technologies to improve ORR performance of platinum and other metal-based electrodes.

SUMMARY

Embodiments described herein relate generally to electrodes for use in fuel cells, and in particular, to melamine modified electrodes and methods of making and using the same.

At least one embodiment relates to a method comprising providing a metal-based electrode and patterning a surface of the metal-based electrode by contacting the electrode with a melamine solution to form a patterned metal-based electrode. The patterned metal-based electrode includes metal sites blocked with melamine molecules and metal sites which are not blocked such that the metal-based electrode selectively adsorbs $O_2$ instead of at least one of sulfate, phosphate, or sulphonate. A range of 20% to 40% of the metal sites are blocked with melamine molecules.

Another embodiment relates to an electrode comprising a patterned metal-based substrate. A surface of the patterned metal-based substrate includes metal sites blocked with melamine molecules and metal sites which are not blocked such that the metal-based electrode selectively adsorbs $O_2$ instead of at least one of sulfate, phosphate, or sulphonate. A range of 20% to 40% of the metal sites are blocked with melamine molecules.

Another embodiment relates to a fuel cell comprising an electrode that comprises a patterned metal-based substrate. A surface of the patterned metal-based substrate includes metal sites blocked with melamine molecules and metal sites which are not blocked such that the metal-based electrode selectively adsorbs $O_2$ instead of at least one of sulfate, phosphate, or sulphonate. A range of 20% to 40% of the metal sites are blocked with melamine molecules.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

FIGS. 6A-6B show characteristic cyclic voltammograms (CVs) of bare and modified Pt(111) surfaces and their ORR polarization plots, respectively.

Figure 1:
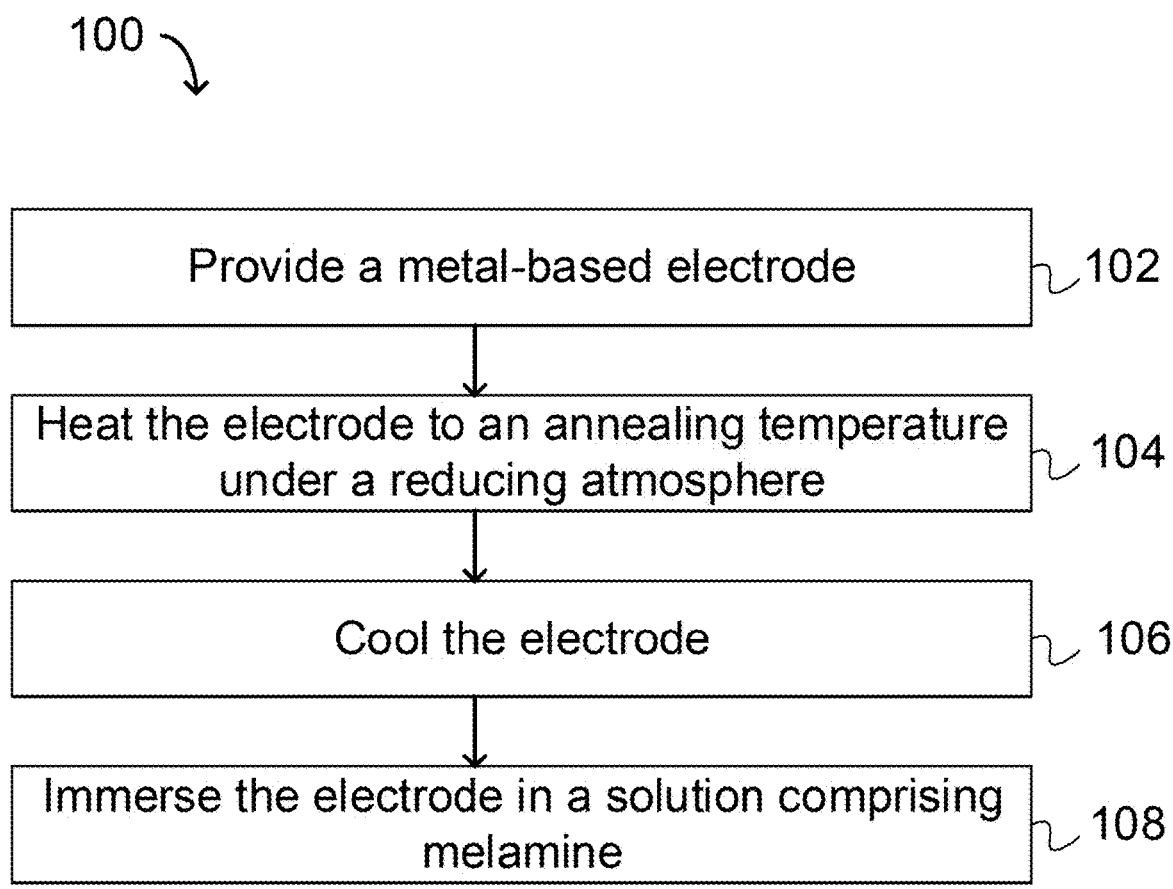
FIG. 1 is a schematic flow diagram of a method for forming a melamine-modified fuel cell electrode, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to electrodes for use in electrochemical devices, and in particular, to melamine modified electrodes and methods of making and using the same.

Traditionally, the parameters considered as guidelines to improve platinum ORR electrocatalysis are based on fine-tuning of the platinum electronic and structural surface properties, which have been shown to potentially increase its catalytic performance. Although the number of approaches used for "surface tuning" is enormous, platinum alloying with non-noble transition metals and/or tailoring platinum nanoparticles with preferential facets have been the most commonly used methods. More recently, however, a precise control of the components and structure of the electrified interface between the platinum electrode surface and the electrolyte (solid/liquid interface) has also been established as a promising way to improve the rate of various electrochemical reactions (e.g., oxygen and hydrogen oxidation/reduction reactions). For instance, the influence of noncovalent interactions (i.e., weaker electrostatic interactions that include ion-dipole, hydrogen bonding, and van der Waals interactions, usually between surface adsorbates and ions/molecules in the interfacial region) on the kinetic rate of the hydrogen oxidation, oxygen reduction, and methanol oxidation reactions on platinum surfaces in alkaline media, providing evidence that at high pH values, the nature and concentration of dissolved cations also play a role as "modulating parameters" for enhancing the electrocatalytic activity. On the other hand, the kinetic activity of the electrochemical interface can also be affected by covalently bonded species (i.e., adsorbates that form strong bonds through electron sharing with the surface atoms). A familiar example is the adverse effect the adsorption of (bi)sulfate ($HSO_4^-$ and $SO_4^{2-}$), phosphate ($PO_4^{3-}$), and/or hydroxyl ($OH_{ad}$) species has on platinum active sites for the ORR. While the adsorption of "small" $OH_{ad}$ species on Pt in aqueous electrolytes is hard to prevent without changing the electronic structure of the metal, there are alternate routes for preventing the adsorption of "bulky" (bi)sulfate or phosphate species. One approach is the chemical modification of electrode surfaces with covalently bonded foreign species, which can affect the reaction kinetics by participating directly in a cooperative process (called the "bifunctional process") or indirectly as surface-blocking spectators (known as the "third body" effect). In one such attempt, a single crystalline Pt(111) surface is modified through the adsorption of cyanide molecules [Pt(111)-$CN_{ad}$] and monitored the influence of this molecular modifier on the ORR rate in different electrolytes. An ORR activity increase on Pt(111)-$CN_{ad}$ compared to bare Pt(111) in electrolytes containing sulfate/phosphate anions (a 25-/10-fold activity enhancement, respectively) was observed. Furthermore, no appreciable difference was seen in the presence of perchlorate anions (a well-known weakly adsorbing anion). $CN_{ad}$ moieties have an appreciable influence on ORR electrocatalysis through a third-body effect, effectively impeding the undesired adsorption of poisonous species ($SO_4^{2-}$ and $PO_4^{3-}$), while not affecting the overall oxygen reduction mechanism.

A common limitation of the modified electrode surfaces is their (electro)chemical stability. The monolayer or sub-monolayer amount of the spectator must compete against several species (e.g., anions and water molecules) present in the electrolyte in the millimolar to molar concentration range, and hence, the stability of anion modifiers will depend on the strength of their interaction with the electrocatalyst surface. To achieve that, molecules that form a stronger bond with the surface or use molecules that bond with multiple bonds, that is, "multidentate" anchoring, can be used thus achieving collectively stronger adsorption to the surface. One molecule that could fit this description is melamine. Melamine is a heterocyclic aromatic molecule composed of a triazine ring ($C_3N_3$) and one amine group ($-NH_2$) bonded on each of the carbon atoms from the aromatic ring. Methods described herein result in the formation of a melamine adlayer on an electrode materials such as a Pt(111) surface [Pt(111)-$M_{ad}$] following the concept of electrocatalyst surface modification by foreign chemical species. Surface-specific X-ray photoelectron spectroscopy studies indicate the deposition of melamine on an electrode surface comprised of Pt(111). ORR curves and characteristic cyclic voltammogram (CVs) plots indicate that the melamine-modified surface of the Pt(111) electrodes result improved chemical stability, an ORR activity increase, and an ORR activity increase after extensive cycling. The slow rate of oxygen reduction reaction (ORR) in phosphoric acid fuel cells is one factor limiting wide application of such cells.

Various embodiments of the melamine-modified fuel cell electrodes may provide one or more benefits including, for example: (1) improving chemical stability; (2) improving ORR activity by a factor of twenty compared to bare Pt(111) in a strongly adsorbing sulfuric acid solution; (3) preventing adsorption of poisoning species such as (bi)sulfate, phosphate or sulfonate; (4) retaining a greater than ninefold higher ORR activity relative to bare Pt(111) after extensive potential cycling; (5) retaining a greater than threefold higher ORR activity relative to $Cn_{ad}$-covered Pt(111) surface; (6) providing melamine molecules that have multiple anchoring sites to the electrode and are difficult to remove; (7) providing stability under different temperatures; (8) improving ORR activity in polymer electrolyte membrane fuel cells (PEMFCs) and phosphoric acid fuel cells (PAFCs) on metal and metal alloy catalysts which can work in parallel with alloying or alone; and (9) allowing use in both PEM and PAFC while other systems may only be utilized in PAFCs.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a schematic flow diagram of a method 100 for forming a melamine-modified electrode, according to an embodiment. The method 100 includes providing a metal-based electrode, at 102. In some embodiments the metal-based electrode may include an active metal catalyst such as Pt, Rn, Rh, Pd, Os, Ir, Fe, Co, Ni, or a combination or alloy of such metals. In some embodiments, the metal-based electrode may include a Pt alloy with one or more of Co, Ni, Fe, Ti, Cr, V, or Mn. In some embodiments, the metal-based electrode comprises Pt(100), Pt(111), Pt(1099), polycrystalline Pt, Au(111), Cu(111), Ni(111), or Pd(111).

The method 100 continues to operation 104 in which the electrode is heated to an annealing temperature under a reducing atmosphere. In some embodiments, the annealing temperature is in a range of about 500 to about 1500 K, inclusive (e.g., 500, 600, 700, 800, 900, 1000, 1100, 1200, 1300, 1400, or 1500 K, inclusive). In some embodiments, the annealing temperature is from about 1000 K to about 1200 K, inclusive (e.g., 1000, 1050, 1100, 1150, or 1200 K, inclusive). In some embodiments, the reducing atmosphere may include hydrogen gas, or hydrogen gas mixed with an inert gas. Illustrative inert gases include, but are not limited to, nitrogen, neon, helium, and argon. Where the hydrogen is mixed with the inert gas, the ratio of hydrogen to inert gas may be from about 0.5 vol % to about 50 vol %, inclusive (e.g., 0.5, 1, 10, 20, 30, 40, or 50 vol %, inclusive). In some embodiments, the ratio is from about 1 vol % to about 10 vol %, inclusive (e.g., 1, 2, 3, 4, 5, 6, 7, 8, 9, or 10 vol %, inclusive). In some embodiments, the electrode is annealed for a time in a range of about 1 to about 30 minutes, inclusive (e.g., 1, 5, 10, 15, 20, 25, or 30 minutes).

The method 100 continues to operation 106 in which the annealed metal-based electrode is then cooled to ambient temperature. The cooled, annealed metal-based electrode may then be covered by a droplet of water to protect the annealed surface before being exposed to the ambient environment. The method 100 then continues to operation 108 in which the metal-based electrode is immersed in a solution comprising melamine. In some embodiments, the solution comprises an aqueous solution of melamine. In some embodiments, the solution is at a solution temperature from about 300 K to about 350 K, inclusive. In some embodiments, the concentration of melamine in the solution is in range of about 1 µM to about 100 inclusive (i.e., 1, 10, 20, 30, 40, 50, 60, 70, 80, 90, or 100 inclusive). In some embodiments, the solution may then be evaporated from the metal-based electrode. In some embodiments, the metal-based electrode may then be rinsed with water.

Figure 2A:
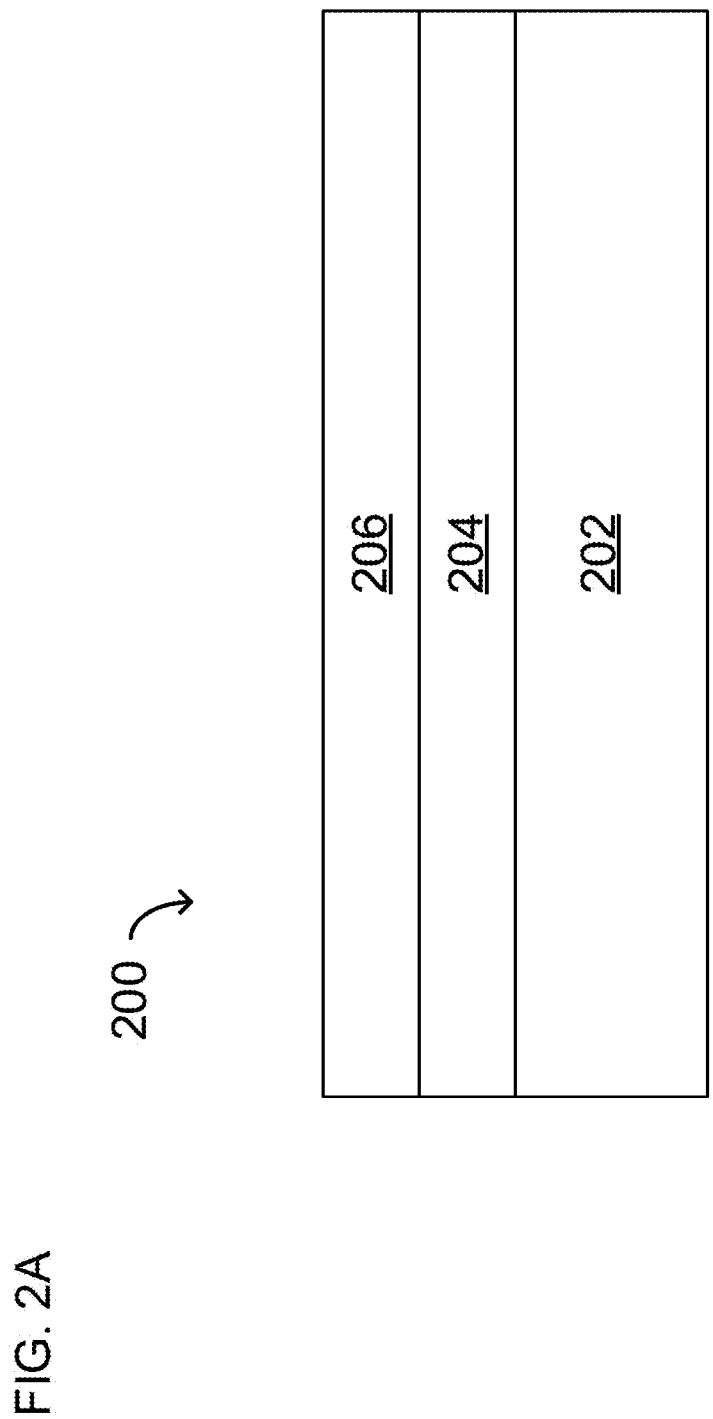
FIG. 2A is schematic block diagram of a metal-based electrode including melamine, according to an embodiment.

FIG. 2A is a schematic block diagram of a metal-based electrode including melamine, according to an embodiment. In some embodiments, a metal-based electrode 200 comprises a metal-based substrate 202, and a surface of the metal-based substrate 202 comprises an adlayer comprising melamine 204. The melamine adlayer 204 may block some sites on the metal substrate 202 and may not block some other sites on the metal substrate 202. In such embodiments, a range of about 20% to 40% of the sites on the metal substrate 202 may be blocked with melamine molecules. In some embodiments, a range of about 60% to about 80% of sites of the metal substrate 202 may not be blocked with melamine molecules. In some embodiments, about 66% of the sites of the metal substrate 202 may not be blocked with melamine molecules. The electrode with melamine adlayer 204 may have a higher adsorption selectivity of $O_2$ than bigger anions such as sulfate, phosphate, and/or sulphonate. Adsorption of sulfate, phosphate, and/or sulphonate is undesired as these anions may deactivate the metal-based electrode 200.

In some embodiments, the metal-based substrate 202 may include a Pt alloy with one or more of Co, Ni, Fe, Ti, Cr, V, or Mn. In some embodiments, the metal-based substrate 202 comprises Pt(100), Pt(111), Pt(1099), polycrystalline Pt, Au(111), Cu(111), Ni(111), or Pd(111). The metal-based electrode 200 may further comprise an additional coating 206 such as a sulfonated tetrafluoroethylene based fluoropolymer-copolymer (e.g., NAFION®) or any other suitable coating material. In such embodiments, the melamine adlayer 204 may prevent the adsorption of sulfate groups from the sulfonated tetrafluoroethylene-based fluoropolymer-copolymer.

Figure 2B:
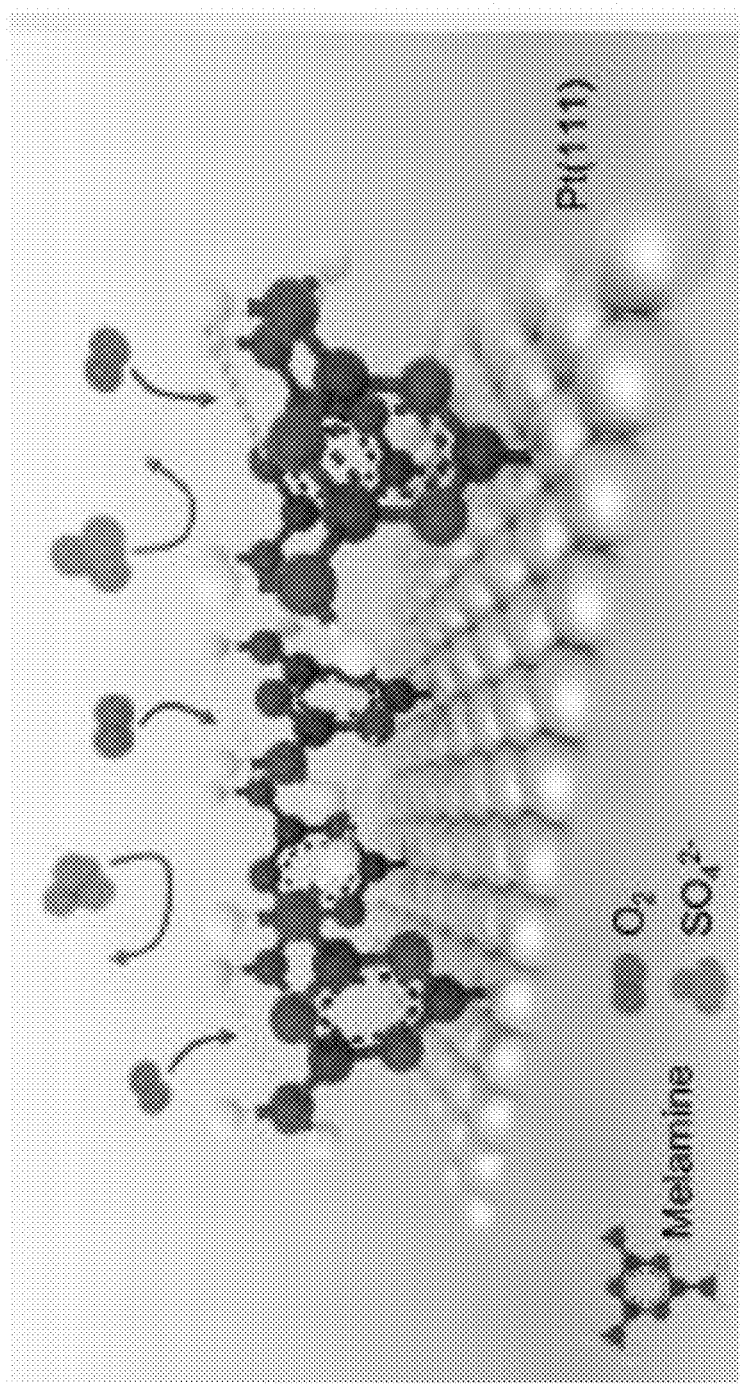
FIG. 2B is schematic illustration of a surface of a melamine-modified fuel cell electrode, according to an embodiment.

FIG. 2B is a schematic of a surface of a melamine-modified metal-based electrode, according to some embodiments. In some embodiments, the metal-based substrate is Pt(111) as shown in FIG. 2B. In such embodiments, the Pt(111) may have sites blocked with melamine molecules and sites which are not blocked. In such embodiments, a range of about 20% to 40% of the Pt(111) sites may be blocked with melamine molecules. In some embodiments, a range of about 60% to about 80% of the Pt(111) sites may not be blocked with melamine molecules. In some embodiments, about 66% of the Pt(111) sites may not be blocked with melamine molecules. In some embodiments, the melamine sterically suppresses spectator anions such as $SO_4^{2-}$ anions due to the formation of a "multidentate" (due to hydrogen bonds) melamine adlayer. In some embodiments, the melamine provides a sufficient number of free metal sites to chemisorb the $O_2$ molecule and break the O—O bond (a $4e^-$ reduction). Therefore, the layer of bound melamine effectively blocks the adsorption of bigger, spectator anions such as sulfate, phosphate, and/or sulphonate while the ORR proceeds largely unhindered. Such modification provides at least a 20-fold improvement of catalysts' activity for the ORR, as compared to the same electrode without such modification with melamine.

In other embodiments, the metal-based substrate of the electrode may include an active metal catalyst such as Pt, Rn, Rh, Pd, Os, Ir, Fe, Co, Ni, or a combination or alloy of such metals. In some embodiments, the metal-based substrate may include a Pt alloy with one or more of Co, Ni, Fe, Ti, Cr, V, or Mn. In some embodiments, the metal-based substrate comprises Pt(100), Pt(111), Pt(1099), polycrystalline Pt, Au(111), Cu(111), Ni(111), or Pd(111). In some embodiments, the metal-based substrate comprises a nanoparticle comprising platinum.

In some embodiments, the electrode described above and as produced by the described methods, may be used in fuel cells. Accordingly, in one aspect, a PAFC or PEMFC is provided including the metal-based electrode comprising the melamine modification. Such fuel cells include, but are not limited to, the electrodes as described above and an electrolyte. For example, in one embodiment, a fuel cell includes a cathode, an anode, and a phosphoric acid-based electrolyte. The cathode catalyst is platinum or platinum group metal or an alloy thereof modified with melamine. The anode catalyst is platinum or platinum group metal or an alloy thereof.

The present technology, thus generally described, will be understood more readily by reference to the following experimental examples, which are provided by way of illustration and are no intended to be limiting.

EXPERIMENTAL EXAMPLES

All electrochemical measurements were carried out in 0.05 M sulfuric acid solutions prepared with ultrapure deionized water (R≥18.2 MΩ cm, Milli-Q system) and ultrahigh purity $H_2SO_4$ (OmniTrace Ultra, EMD). The electrolyte temperature was ~293 K, and the electrolyte was purged with either argon gas (99.9999% purity, Airgas) for CV or oxygen gas (99.999% purity, Airgas) for ORR polarization curves, and the potential sweep rate was 50 mV s$^{-1}$ for all curves presented in this work. A platinum wire (99.997% purity, Alfa Aesar) and a silver/silver chloride electrode saturated with potassium chloride (BASi) were used as the counter and reference electrodes, respectively, although all potentials presented hereafter are shown versus the reversible hydrogen electrode, whose potential was determined in a separate experiment using the same electrochemical conditions mentioned above except for the electrolyte was purged with hydrogen gas (99.9999% purity, Airgas). A single-crystalline platinum surface, Pt(111), was prepared. Briefly, a 6 mm surface diameter by 4 mm height Pt(111) disk (Princeton Scientific) was annealed in a controlled atmosphere of a hydrogen/argon gas mixture (3% $H_2$/97% Ar mixture, Airgas) at ~1 atm and ~1473 K for 7 min with the help of a radio frequency induction system (EASYHeat, Ambrell) and cooled slowly (ca. 7 min) under the same atmosphere conditions. The Pt(111) surface was protected with a water droplet before being exposed to the laboratory atmosphere. The platinum disk was then carefully assembled into a rotating disk electrode (RDE) configuration to avoid exposure of the Pt(111) surface to air (a polypropylene thin sheet was used to support the platinum disk during the RDE assembling, with the Pt(111) surface facing toward the sheet protected with a thin water film). The RDE system was then attached to a shaft and connected to a rotator machine (MSR, Pine Research). The Pt(111) surface was immersed in the electrolyte at a controlled potential (E=0.45 V) before the electrochemical experiments. A rotation speed of 1600 rpm was used to obtain the ORR polarization curves (CVs were obtained without rotation). All ORR polarization curves shown in this work are the positive-going potential sweep ("anodic sweep").

For the preparation of the melamine adlayer [Pt(111)-$M_{ad}$], 50 µL of a hot (~343 K) 50 µM melamine (99% purity, Aldrich) solution was added to a freshly annealed Pt(111) surface (protected with a film of water) already assembled in the RDE configuration. The melamine solution droplet was evaporated from the platinum surface under vacuum and a controlled temperature (ca. 303 K). Finally, the Pt(111)-$M_{ad}$ surface was rinsed thoroughly with water. Similar to the bare Pt(111) surface, the modified Pt(111) surfaces were immersed in the electrolyte at E=0.45 V.

For the preparation of the cyanide adlayer [Pt(111)-$CN_{ad}$], a freshly annealed Pt(111) surface protected with a droplet of water was emerged in a 0.1 M potassium cyanide (≥97.0% purity, Alrich) solution for 25 minutes. The platinum crystal was rinsed thoroughly with water before being assembled into the RDe configuration. Five CVs (0.5 V<E<0.95 V) were performed to remove any residual excess of cyanide specifies form the platinum surfaces.

Figure 3:
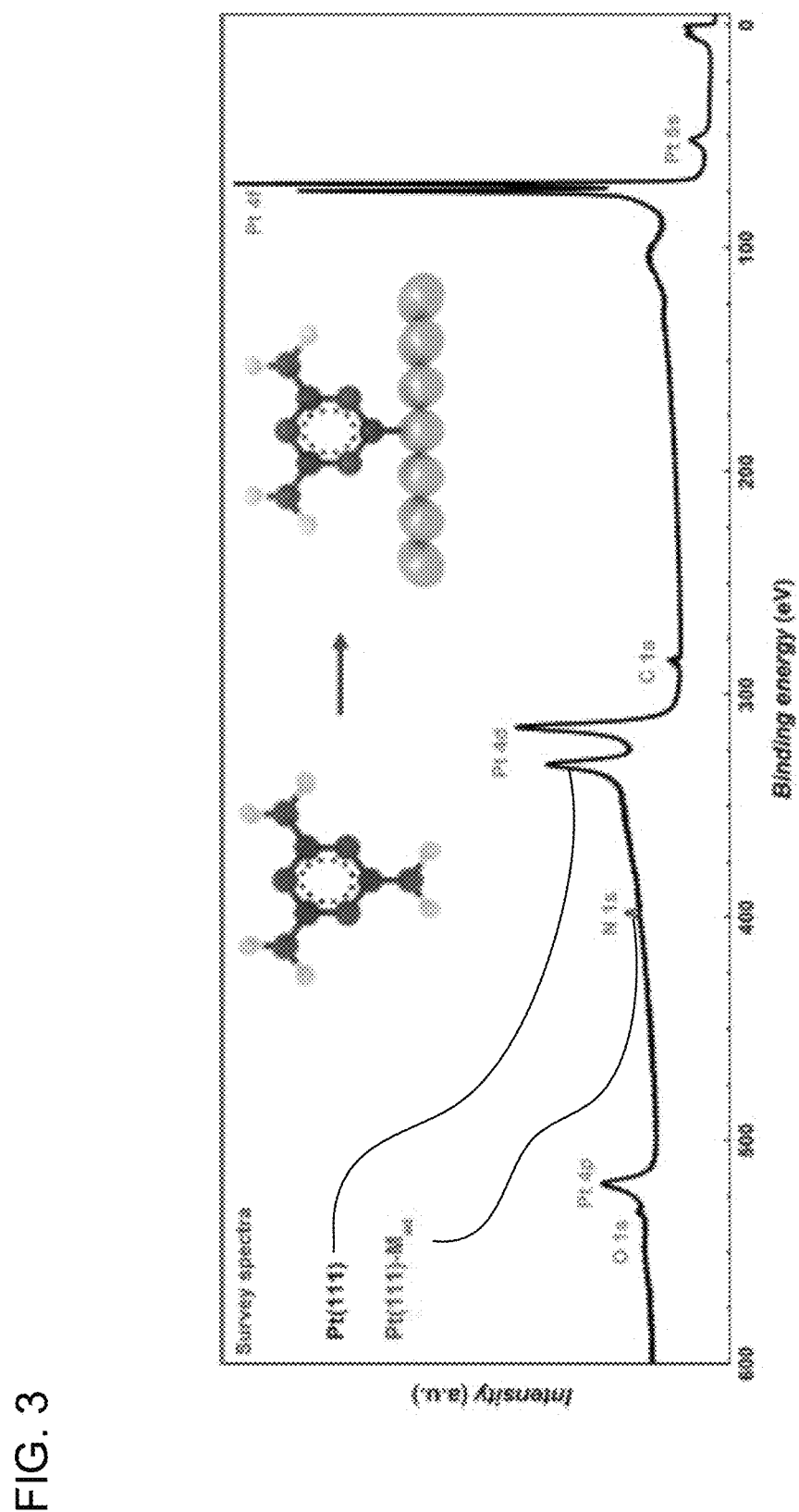
FIG. 3 shows the X-ray photoelectron spectroscopy (XPS) plot of a Pt(111) surface with and without melamine modification.
Figure 4A:
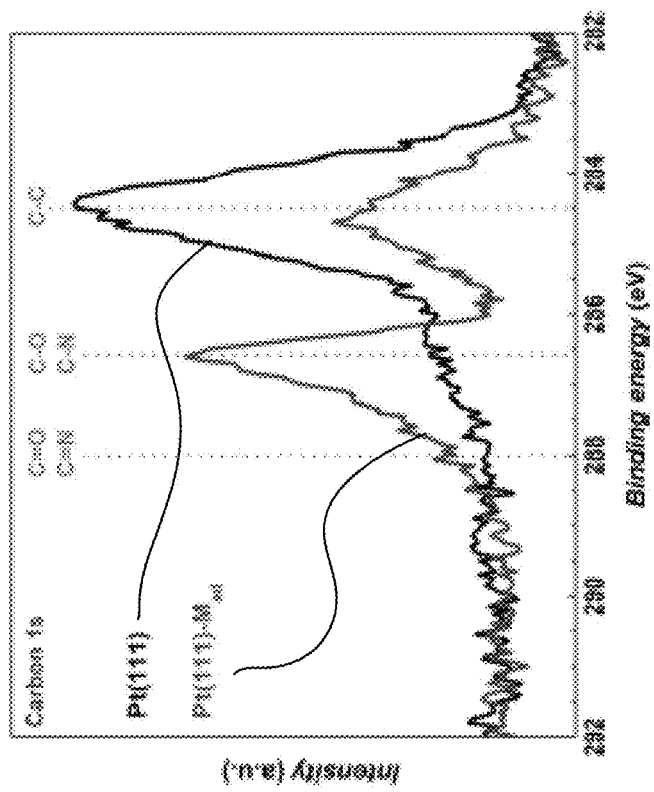
FIGS. 4A-4B show XPS plots of a nitrogen spectra and a carbon spectra, respectively, of a Pt(111) surface with and without melamine modification.
Figure 4B:
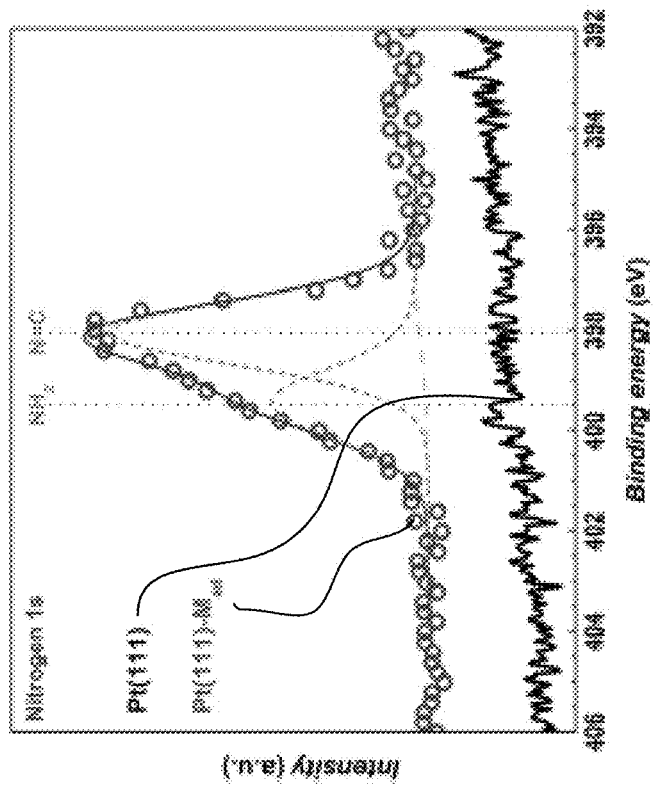

In order to probe the presence of adsorbed melamine on the platinum surface, X-ray photoelectron spectroscopy (XPS) was performed on Pt(111) and Pt(111)-$M_{ad}$ surfaces, as shown in FIGS. 3 and 4A-B. The bare and modified Pt(111) surfaces were prepared exactly in the same fashion as for the electrochemical studies, subsequently transferred to an antechamber protected by a water droplet that was later evaporated under vacuum before being transferred to the main glovebox chamber ($O_2$ and $H_2O$: <0.5 ppm), which is connected to a load lock UHV chamber before its transfer for the positioning for XPS analysis. XPS measurements were performed using a Specs PHOIBOS 150 hemispherical energy analyzer with a monochromatic Al Kα X-ray source. The survey spectra were measured using a pass energy of 40 eV at a resolution of 0.2 eV step$^{-1}$ and a total integration time of 0.1 s point$^{-1}$. The core level spectra were measured using a pass energy of 20 eV at a resolution of 0.05 eV step$^{-1}$ and a total integration time of 0.5 s point$^{-1}$. Deconvolution was performed using CasaXPS software with a Shirley-type background and 70-30 Gaussian-Lorentzian peak shapes. Charge referencing was performed using adventitious carbon at 284.8 eV. Pt(111)-$CN_{ad}$ was not characterized by XPS due to the vast past exploration and reproducibility of this surface found in the literature.

As shown in FIG. 3, the XPS plot for the bare and melamine-modified Pt(111) surfaces show the successful deposition of melamine. FIG. 3 further shows the structure of isolated melamine and the suggested structure of melamine adsorbed on Pt(111) based on a stoichiometric analysis of nitrogen functionalities from the nitrogen core level spectrum for Pt(111)-$M_{ad}$. The platinum peaks are remarkably similar, implying that the platinum surface remains virtually intact even after the melamine assembly. Moreover, the fact that the platinum peaks show a zero-oxidation state surface (metallic platinum) indicates that the method for crystal surface preparation does not introduce foreign impurities, which may induce platinum surface oxidation (note the absence of undesirable elements in the spectra).

FIGS. 4A-B show the nitrogen 1s and carbon 1s core level spectra, respectively, or the bare and melamine-modified Pt(111) surfaces. FIG. 4A indicates the presence of both N═C and —$NH_2$ functionalities at the binding energies of 399.1 and 399.5 eV, respectively, consistent with the presence of melamine on the surface. In contrast, the nitrogen core level spectrum for unmodified Pt(111) shows no visible features, confirming that all nitrogen content present on Pt(111)-$M_{ad}$ derives from the melamine assembly. Interestingly, N═C and —$NH_2$ functionalities on Pt(111)-$M_{ad}$ surfaces are present in a ratio of ~2:3 instead of the 1:1 ratio expected for isolated melamine molecules. This deviation from the expected stoichiometry suggests that melamine molecules may be adsorbed via one of the cyclic carbon atoms, resulting in the release of an amine group. Overall, the XPS results presented in this work are in accordance with previous studies found in the literature, where the high chemical integrity and robustness of melamine networks on metal surfaces were demonstrated under both atmospheric and UHV conditions. It is noted that an extensive STM investigation of the Pt(111)-$M_{ad}$ surface was performed and an ordered melamine structure could not be found, suggesting that the melamine adlayer on Pt(111) is in fact disordered.

In FIG. 4B, an increase of the carbon peak intensity at a binding energy of ~286-288 for Pt(111)-$M_{ad}$ points toward successful deposition of melamine on the platinum surface. Melamine is a heterocyclic aromatic molecule composed of a triazine ring ($C_3N_3$) with one amine group (~$NH_2$) bonded to each of the carbon atoms in the aromatic ring. Although the binding energies (BEs) of C—O and C—N (as well as C═O and C═N) bonds are very close to each other, making it difficult to uniquely fit the carbon core level spectra, an increase of the carbon peak intensity at a BE of ~286-288 eV for Pt(111)-$M_{ad}$ relative to unmodified Pt(111) points toward successful deposition of melamine on the platinum surface.

Figure 5:
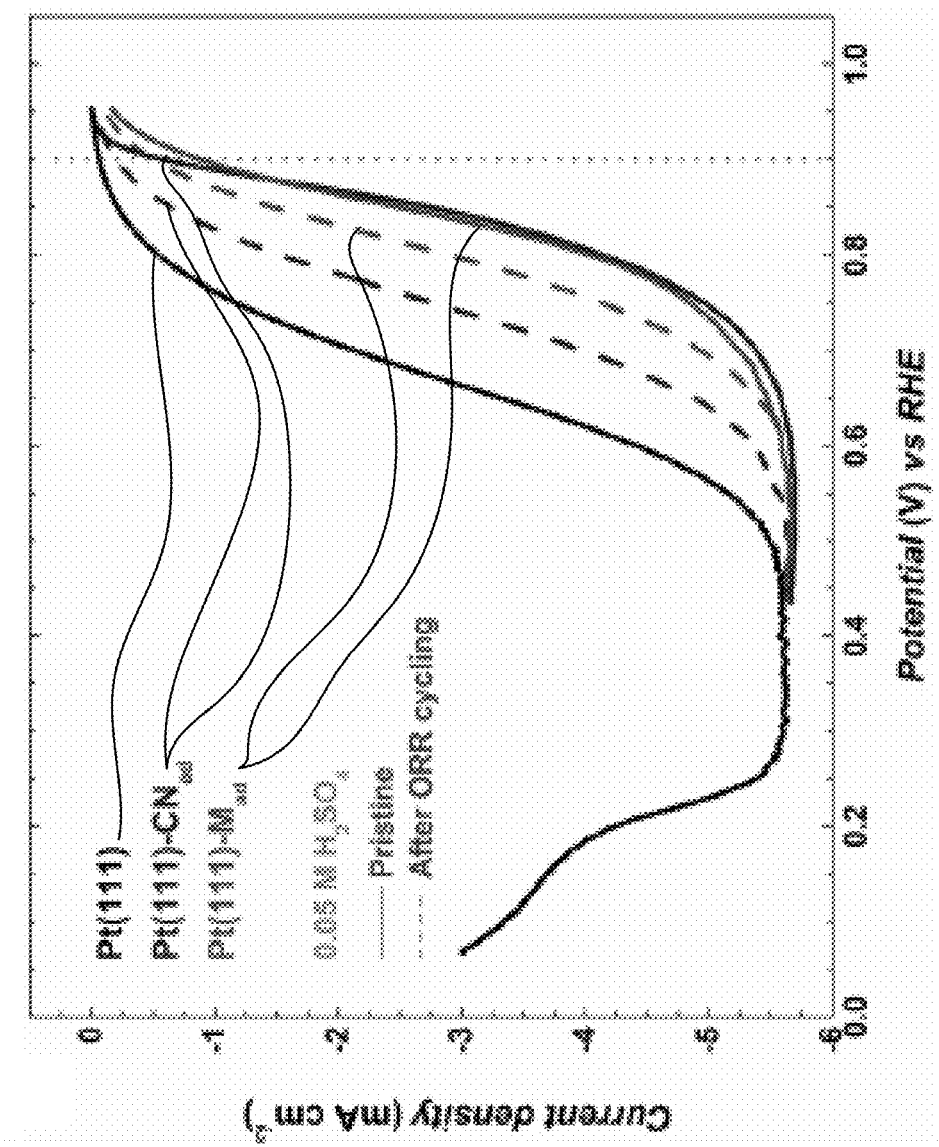
FIG. 5 shows oxygen reduction reaction (ORR) curves of the bare and modified Pt(111) surfaces before and after extensive potential cycling experiments.

FIG. 5 shows the ORR polarization curves of the modified Pt(111) surface before and after extensive potential cycling experiments. The curves were measured in $O_2$-saturated 0.05 M sulfuric acid solutions at a temperature of about 293 K, at a sweep rate of 50 mVs$^{-1}$, and 1600 using the rotating disk electrode (RDE) configuration to avoid exposure of the Pt(111) surface to air. The dotted vertical line is present as an eye guide to spot the difference in ORR activities (E=0.9 V) of the modified Pt(111) surfaces before (solid curves) and after 100 potential cycles (0.45 V>E>0.95) (dashed curves). The bare Pt(111) ORR polarization curve is also shown for comparison.

Both modified platinum surfaces remain more active toward the ORR than Pt(111), with Pt(111)-$M_{ad}$ and Pt(111)-$CN_{ad}$ surfaces exhibiting a factor of 9 and 3 higher activity, respectively, than bare Pt(111). The reason for the Pt(111)-$M_{ad}$ and Pt(111)-$CN_{ad}$ interface instability, and thus their partial deactivation, is most likely a result of $M_{ad}$/$CN_{ad}$ oxidation or displacement through (bi)sulfate or $OH_{ad}$ adsorption. More importantly though, Pt(111)-$M_{ad}$ shows a much higher stability than Pt(111)-$CN_{ad}$, resulting in a 75 mV lower overpotential for the ORR. As mentioned earlier, the purpose of chemical modification with melamine, as opposed to cyanide, was to create the possibility of stronger adsorption of the molecules to the catalyst surface, either through strengthening the single bond or creating multidentate bonding to the surface by taking advantage of the intermolecular networks formed by hydrogen bonds for various metal-melamine systems, previously demonstrated in other studies.

FIGS. 6A-B show characteristic cyclic voltammograms (CVs) of the bare Pt(111) and Pt(111) with cyanide or melamine adlayers (hereafter denoted as Pt(111), Pt(111)-$CN_{ad}$, and Pt(111)-$M_{ad}$, respectively) in 0.05 M $H_2SO_4$. The well-known potential interval regions of the Pt(111) CV in sulfuric acid are evident: region I, adsorption of hydrogen, known as underpotential-deposited hydrogen region ($H^+e^- \rightleftharpoons H_{upd}$), located in the range of 0.05 V and 0.4 V, region II, located between 0.4 and 0.6 V, where the adsorption of (bi)sulfate anions is considered to take place, followed by region III, 0.6-1.0 V, where the adsorption of $OH_{ad}$ and the formation of platinum oxide (PtO) are observed.

Although the Pt(111)-$CN_{ad}$ CV potential regions I, II, and III expand/contract compared to Pt(111) as shown in FIG. 6A, virtually all the same qualitative features are present, namely, region I, 0.05-0.6 V, the $H_{upd}$ region, followed by a small pseudocapacitance region between 0.6 and 0.8 V (region II), and finally region III, 0.8-1.0 V, where the formation of platinum-oxygenated species takes place. It is important to note the presence of a small but distinguishable current density between ~0.7 and ~0.8 V, which is assigned to the adsorption/desorption of a tiny amount of (bi)sulfate species onto the Pt(111) surface. Nevertheless, the site availability for "bulky" (bi)sulfate adsorption is incredibly small (region II, FIG. 6A), compared to the site availability for "small" $O_2$ molecule adsorption. As previously described, the $CN_{ad}$ ensemble on the Pt(111) surface acts as a "blocking body" ("third-body" effect), sterically hindering the specific adsorption of (bi)sulfate anions on platinum surface sites. In contrast, the adsorption of oxygen molecules (necessary for ORR electrocatalysis) is possible in the vicinity of adsorbed $CN_{ad}$, that is, free Pt(111) surface sites, resulting in an astonishing improvement of the ORR activity (e.g., 25-fold increase versus the bare platinum in a sulfuric acid electrolyte).

FIG. 6A shows the Pt(111)-$M_{ad}$ CV in the aqueous sulfuric acid electrolyte, which shows two potential regions: region I, 0.05-0.4 V, assigned to the adsorption of hydrogen ($H_{upd}$). The asymmetry in the anodic and cathodic $H_{upd}$ peaks may stem from the slow rearrangement and/or reorientation of melamine molecules while always staying attached to the surface. Region II, 0.4-1.0 V, is fairly featureless and reminiscent of typical double layer charging. However, the currents in this region are higher than those typically observed for double layer charging, suggesting that some adsorption processes do indeed occur at these potentials as well. This demonstrates that the adsorption of (bi)sulfate is suppressed on the Pt(111)-$M_{ad}$ surface in the same fashion as on Pt(111))-$CN_{ad}$, likely via the same "third-body" effect. Region III, observed for the bare and $CN_{ad}$-covered platinum surfaces, is absent in the Pt(111)-$M_{ad}$ CV profile, indicating that the adsorption of oxygenated species (e.g., $OH_{ad}$) is completely suppressed on this electrocatalyst surface in the potential window measured for this work. As will be discussed later, this characteristic has a strong impact on the ORR kinetics, as shown in FIG. 6B.

In order to make a reliable analysis of the ORR activities for the platinum surfaces described above, the following equation is adopted:

$$i_{E_x} = nFK_x c_{O_2}[1-\Theta_{cov.}(\Delta G_{cov.\text{-}spec.})-\Theta_{non\text{-}cov.}(\Delta G_{non\text{-}cov.\text{-}spec.})] \quad (1)$$

where $i_{E_x}$ is the current density of a generic electrocatalyst (x) at a particular potential (here we will use $E_x$=0.9 V for ORR kinetic analysis), n is the number of electrons transferred during the reduction of one mole of oxygen molecules, F is the Faraday constant, $K_x$ is a constant, $c_{O_2}$ is the concentration of oxygen molecules dissolved in the electrolyte solution, $\Theta_{cov.}+\Theta_{non\text{-}cov.}=\Theta_{ad}$ is the fraction of the electrode surface that is blocked by covalently and noncovalently adsorbed species, and $\Delta G_{cov.\text{-}spec.}$ and $\Delta G_{non\text{-}cov.\text{-}spec.}$ are the free energies of adsorption of their respective species ("spectators") on an electrode surface. It is important to note that covalent bonding of spectator species on platinum and platinum-group metal surfaces depends strongly on the metal-spectator energetics ($\Delta G_{cov.\text{-}spec.}$); hence, the rate of reaction will be strongly related to the nature of the metal surface. Usually, the covalently bound spectators relevant for ORR electrocatalysis are strongly adsorbing anions (e.g., $SO_4^{2-}$, $HSO_4^-$, $Cl^-$, and $NO_3^-$, to name a few), $OH_{ad}$ and $H_{upd}$, although in this case, $CN_{ad}$ and $M_{ad}$ must be also considered. Although the extent of interaction between covalently bound spectators and hydrated ions located at the double layer region (specifically, the outer Helmholtz phase) can also influence the reaction rate (i.e., current density $i_{E_x}$), this phenomenon is less pronounced in acidic electrolytes free of foreign cations (e.g., Li+, Na+, and K+). Therefore, the $\Theta_{non\text{-}cov.}$ ($\Delta G_{non\text{-}cov.\text{-}spec.}$) term (eq. 1) will have a small influence on iEx in a sulfuric acid electrolyte and can be neglected in this case.

Considering the approach described in the last paragraph for the activity analysis for ORR in acidic media, the simplest solid/liquid interface employed is employed: the Pt(111) surface in contact with a 0.05 M $H_2SO_4$ solution saturated with $O_2$ (FIG. 6B). Some general aspects of the electrocatalytic behavior must be assessed. First, the poor activity at 0.85 V for the ORR is observed due to the strong adsorption of (bi)sulfate anions on the Pt(111) surface, 40 that is, the low availability of active sites or low 1−$\Theta_{cov.}$ ($\Delta G_{cov.\text{-}spec}$) (eq 1). An ORR polarization curve for Pt(111) in a 0.1 M $HClO_4$ solution is also shown for comparison, as $ClO_4^-$ is a well-known weakly adsorbing anion. Second, oxygen reduction proceeds through a 4e$^-$ reaction pathway on Pt(111) in acidic environments at potentials higher than 0.4 V despite the higher ORR activity in a perchloric acid solution. Third, the formation of $H_{upd}$ results in an ORR pathway change to a 2e$^-$ route at E<0.4 V. Finally, the intermediates formed during the ORR have a small contribution to the covered amount of species on the platinum surface, that is, they have a minor contribution to the $\Theta_{ad}$ term in eq. 1 and thus play a small role in controlling the ORR kinetics on platinum.

In FIG. 6B, both $CN_{ad}$ and $M_{ad}$ platinum surfaces show an improved activity for oxygen reduction compared to the bare platinum surface: a factor of 22 higher for Pt(111)-$CN_{ad}$ and a factor of 20 higher for Pt(111)-$M_{ad}$ at E=0.85 V. A notable difference between these modified surfaces is the change of the slope of the ORR curve above ~0.9 V. This feature is attributed to the contribution of $OH_{ad}$ adsorption to the additional coverage on Pt(111)-$CN_{ad}$ (see CV for this surface shown FIG. 6A), hence reducing the activity for the ORR. As for Pt(111)-$M_{ad}$, the ORR curve at E>0.9 V in 0.05 M $H_2SO_4$ matches the one for Pt(111) in 0.1 M $HClO_4$. This is a first sign that $M_{ad}$ does not contribute to suppressing the Pt(111) ORR activity in the kinetically controlled potential region. Indeed, the activity of Pt(111)-$M_{ad}$ is a factor of 1.6 higher than that of Pt(111)-$CN_{ad}$ for ORR at E=0.9 V. A 4e$^-$ pathway for oxygen reduction is observed on both modified platinum surfaces, which implies that $CN_{ad}$ and $M_{ad}$ do not influence the ORR mechanism. Therefore, $CN_{ad}$ and $M_{ad}$ adlayers act purely as a steric blockage, implying that the kinetics for ORR must be governed purely by the $(1-\Theta_{ad})$ term in eq. 1.

Figures 7A, 7B:
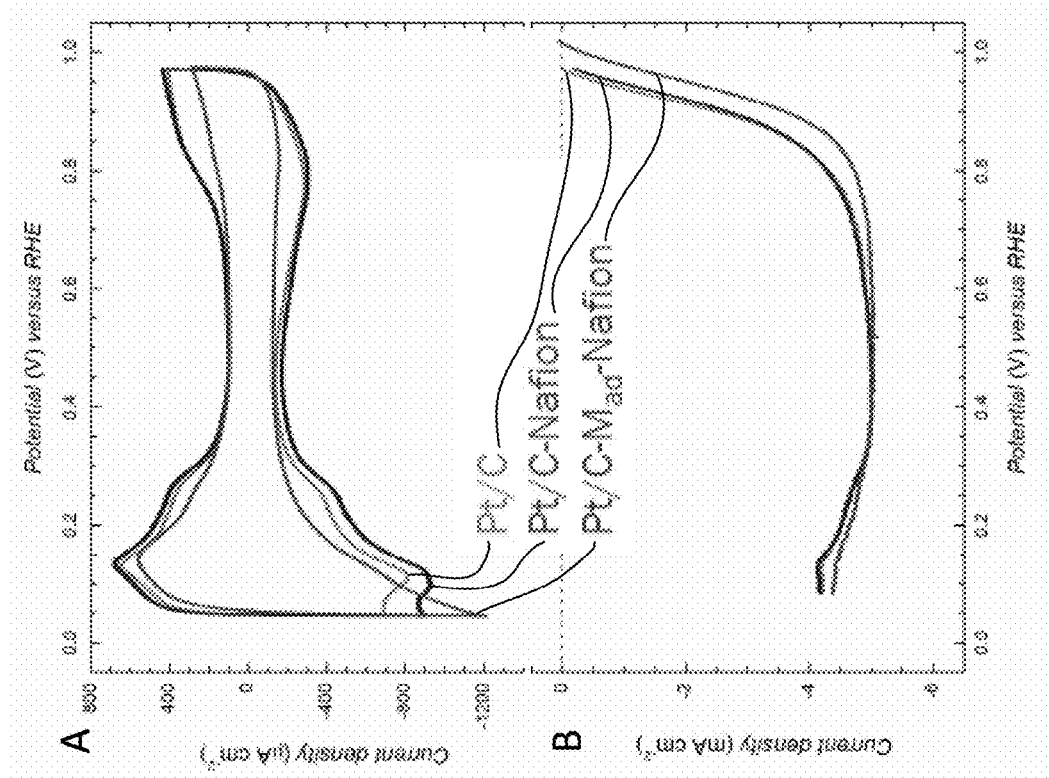
FIGS. 7A-B shows characteristic CVs of bare and modified Pt(111) surfaces with carbon and NAFION® and their respective ORR polarization curves.

FIGS. 7A-B are directed to the application of melamine surface modification for carbon-supported platinum nanoparticle electrocatalyst used in polymer electrolyte membrane fuel cells (PEMFCs) and show the CV for platinum/carbon surfaces (Pt/C), platinum/carbon/NAFION® (Pt/C-Nafion), and melamine modified platinum/carbon/NAFION® (Pt/C-$M_{ad}$-Nafion) (FIG. 7A) and the ORR polarization curves (FIG. 7B). As seen in FIG. 7A, the CV shows low amount of oxygenated-platinum (PtOH) species formulation (E>0.7 V) compared with pure Pt/C and Pt/C-NAFION®surfaces. FIG. 7B shows enhanced ORR activity for melamine modified Pt/C-$M_{ad}$-NAFION®surfaces in comparison to the pure Pt/C and Pt/C-NAFION®surfaces.

Figure 8:
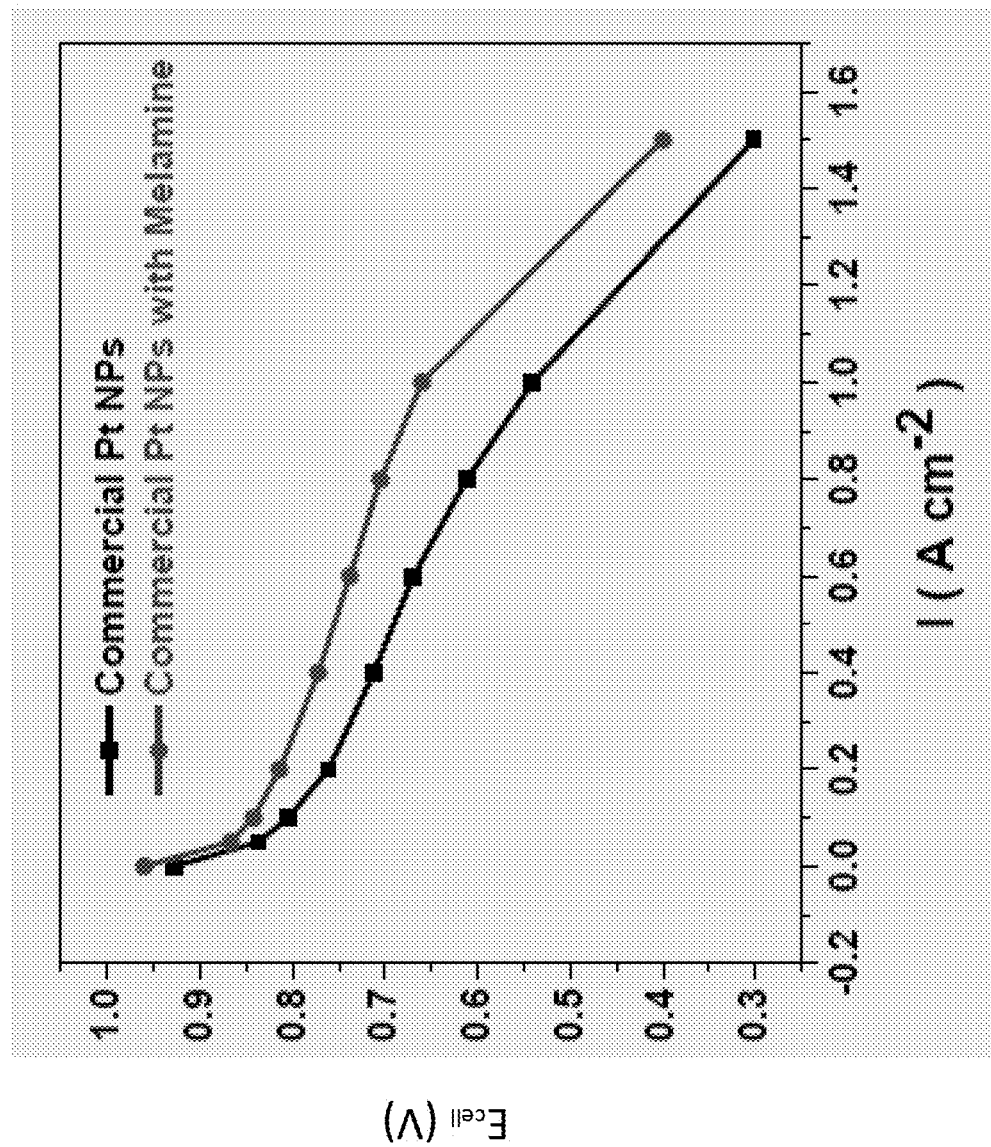
FIG. 8 shows fuel cell energy of bare and melamine-modified Pt electrode nanoparticles.

FIG. 8 is directed to the application of melamine-modified platinum/carbon (Pt/C-$M_{ad}$) electrocatalyst in a membrane-electrode assembly (MEA) or otherwise known as a unit polymer electrolyte membrane fuel cell (PEMFC) and shows the cell voltage of commercial platinum nanoparticles in comparison to the cell voltage of melamine-modified commercial platinum nanoparticles. The MEA prepared using Pt/C-$M_{ad}$ electrocatalyst shows improved activity compared with MEA prepared using pure Pt/C.

No claim element herein is to be construed under the provisions of 35 U.S.C. § 112(f), unless the element is expressly recited using the phrase "means for."

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A method comprising:
providing a metal-based electrode;
patterning a surface of the metal-based electrode by contacting the electrode with a melamine solution to form a patterned metal-based electrode, the patterned metal-based electrode comprising metal sites blocked with melamine molecules and metal sites which are not blocked such that the metal-based electrode selectively adsorbs $O_2$ instead of at least one of sulfate, phosphate, or sulphonate,
wherein a range of 20% to 40% of the metal sites are blocked with melamine molecules.

2. The method of claim 1, wherein the metal-based electrode comprises Pt, Pd, Ir, or Rh, or a Pt alloy with one or more of Co, Ni, Fe, Ti, Cr, V, or Mn.

3. The method of claim 1, wherein the metal-based electrode comprises Pt(100), Pt(111), Pt(1099), or polycrystalline Pt.

4. The method of claim 1, wherein the metal-based electrode comprises Au(111), Cu(111), Ni(111), or Pd(111).

5. The method of claim 1, wherein the patterning comprises:
heating the metal-based electrode to an annealing temperature in a range of about 500 K to about 1500 K under a reducing atmosphere;
cooling the electrode; and
immersing the electrode in the melamine solution.

6. The method of claim 5, wherein the annealing temperature is in a range of about 1000 K to about 1200 K.

7. The method of claim 5, wherein the reducing atmosphere comprises hydrogen gas.

8. The method of claim 5, wherein the reducing atmosphere comprises hydrogen gas and an inert gas.

9. The method of claim 8, wherein the inert gas comprises He, Ne, Ar, or Na.

10. The method of claim 5, where the electrode is cooled to about ambient temperature.

11. The method of claim 5, wherein the solution comprises an aqueous solution of melamine.

12. The method of claim 11, wherein the solution is at a solution temperature from about 300 K to about 350 K.

13. The method of claim 11, wherein the concentration of the melamine in the solution is in a range from of 1 μM to about 100 μM.

14. The method of claim 5, wherein the solution is evaporated from the metal-based electrode.

15. An electrode, comprising:
a patterned metal-based substrate, a surface of the patterned metal-based substrate comprising metal sites blocked with melamine molecules and metal sites which are not blocked such that the metal-based electrode selectively adsorbs $O_2$ instead of at least one of sulfate, phosphate, or sulphonate, wherein a range of 20% to 40% of the metal sites are blocked with melamine molecules.

16. The electrode of claim 15, wherein the metal-based substrate comprises Pt, Pd, Ir, or Rh, or a Pt alloy with one or more of Co, Ni, Fe, Ti, Cr, V, or Mn.

17. The electrode of claim 15, wherein the metal-based substrate comprises Pt(100), Pt(111), Pt(1099), polycrystalline Pt, Au(111), Cu(111), Ni(111), or Pd(111).

18. The electrode of claim 15, wherein the metal-based substrate comprises a nanoparticle comprising platinum.

19. The electrode of claim 15, further comprising:
a sulfonated tetrafluoroethylene based fluoropolymer-copolymer coated on the metal-based substrate.

20. A fuel cell comprising the electrode of claim 15.

* * * * *